United States Patent
Epstein et al.

(10) Patent No.: US 6,694,025 B1
(45) Date of Patent: Feb. 17, 2004

(54) METHOD AND APPARATUS FOR SECURE DISTRIBUTION OF PUBLIC/PRIVATE KEY PAIRS

(75) Inventors: Michael A. Epstein, Spring Valley, NY (US); Michael S. Pasieka, Thornwood, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/323,807

(22) Filed: Jun. 2, 1999

(51) Int. Cl.[7] .............................. H04L 9/00; H04L 9/32; H04K 1/00
(52) U.S. Cl. ...................... 380/279; 380/278; 380/281; 380/282; 380/286; 380/277; 713/183; 713/200; 713/201
(58) Field of Search ................................. 380/278, 279, 380/282, 281, 286, 277, 30; 713/183, 200, 201

(56) References Cited

U.S. PATENT DOCUMENTS

| | | | | |
|---|---|---|---|---|
| 5,142,578 A | * | 8/1992 | Matyas et al. ............... | 380/281 |
| 5,418,854 A | * | 5/1995 | Kaufman et al. ........... | 713/183 |
| 5,555,309 A | * | 9/1996 | Kruys ......................... | 380/281 |
| 5,557,678 A | | 9/1996 | Ganesan ...................... | 380/21 |
| 5,604,801 A | * | 2/1997 | Dolan et al. ................ | 380/277 |
| 5,825,880 A | * | 10/1998 | Sudia et al. ................ | 380/286 |
| 5,867,578 A | * | 2/1999 | Brickell et al. ............. | 380/286 |
| 6,044,155 A | * | 3/2000 | Thomlinson et al. ....... | 380/277 |
| 6,151,676 A | * | 11/2000 | Cuccia et al. ............... | 380/278 |
| 6,263,446 B1 | * | 7/2001 | Kausik et al. .............. | 380/282 |
| 6,370,250 B1 | * | 4/2002 | Stein .......................... | 380/277 |

FOREIGN PATENT DOCUMENTS

| | | | | |
|---|---|---|---|---|
| EP | 0738058 A2 | 10/1996 | ............. | H04L/9/08 |
| EP | 0792043 A2 | 8/1997 | ............. | H04L/9/08 |
| EP | 0833241 A2 | 4/1998 | ............. | G06F/1/00 |
| WO | WO9528784 | 2/1995 | ............. | H04L/9/08 |

* cited by examiner

*Primary Examiner*—Thomas R. Peeso
*Assistant Examiner*—Abdulhakim Nobahar

(57) ABSTRACT

A list of public/private key pairs are stored at a server, wherein the private key is stored in an encrypted form, the encryption being based on a master key. To distribute a public/private key pair to a new user, an administrator who has access to the master key retrieves the next available public/private key pair from the server at a client processor that is convenient to both the administrator and the new user. At the client processor, the administrator decrypts the private key of the public/private key pair, using the master key, and provides both the public and private keys to the new user. The new user encrypts the private key, using a biometric or passphrase that is secret to the new user. The private key is immediately erased from the client processor upon encryption with the user's biometric or passphrase key. The encrypted private key, the corresponding public key, and an identification of the new user are communicated to and stored at the server for subsequent access by the new user, and potentially others. By employing this technique, the private key is vulnerable to detection only within the client processor, and only for a brief period of time.

21 Claims, 4 Drawing Sheets

METHOD AND APPARATUS FOR SECURE DISTRIBUTION OF PUBLIC/PRIVATE KEY PAIRS

BACKGROUND OF THE INVENTION

1. Field of the Invention

This invention relates to the field of cryptography, and in particular to the distribution of private keys in a public/private key pair via a network.

2. Description of Related Art

As the use of networked systems for communication of information increases, and potential access to such networked systems increases, the need for securing communications on the networked systems increases. A number of systems are currently available for encrypting and decrypting messages, and for certifying the originator of a message. An encryption technique that is commonly employed by such systems is one that is based on a public/private key pair technique, such as the RSA (Rivest, Shamir, Adleman) public-key cryptosystem.

In a public/private key pair cryptosystem, a unique public key is generated from a private key using a mathematical technique that is extremely difficult, and practically impossible, to apply in reverse. That is, knowledge of the public key does not facilitate the determination of the private key in a public/private key pair. The public/private key pairs are employed in a corresponding encryption system in such a way that a document, or message, that is encrypted using one of the keys can only be decrypted by the other key. (For the purposes of this document, it is assumed that encrypted messages cannot be decrypted without an appropriate key, even though there may be some finite mathematical possibility that the message may be decrypted by someone without the authorized key.) A public/private key system is termed an asymmetric encryption system, in contrast to a symmetric system, such as Data Encryption Standard (DES) published by the U.S. National Institute of Standards and Technology, wherein the same key is used to encrypt and decrypt a message. Another asymmetric key system common in the art is the ElGamal system, and other symmetric key encryption systems include the IDEA algorithm and the Blowfish algorithm.

In operation, a user of the cryptosystem is assigned a public and private key of a key pair. As its name implies, the public key is intended to be distributed freely by the user, while the private key is intended to be kept secret by the user. When another person wants to send a secure message to the user, the other person encrypts the message using the user's public key, and then sends the encrypted message to the user. The user decrypts the encrypted message using the user's private key. Because the encrypted message cannot be decrypted without the private key, the encrypted message can be communicated openly, without fear of being readable by anyone other than the user, assuming that the user has kept the private key secure. If the other person wants to send the same message to multiple users, the other person creates multiple encryptions of the message, using each user's public key.

Another use of a public and private key pair is authentication. Authentication is a means for verifying the sender of a message. A message is authenticated by encrypting the message using the sender's private key. When the message is received, the recipient decrypts the message using the sender's public key. Because the sender's public key can only decrypt a message that is encoded using the sender's private key, a successful decryption of the message is an authentication of the sender of the message, assuming that the sender has kept the private key secure.

An alternative authentication method is to encrypt a unique characteristic of the message using the user's private key. The unique characteristic is a characteristic that changes whenever any changes are made to the message. The user sends the message and encrypted characteristic to another person. The other person applies the sender's public key to the encrypted characteristic. If the decrypted characteristic matches the unique characteristic of the message, the message is verified as having come from the sender, assuming again that the sender has kept the private key secure.

Although the use of a public/private key pair encryption system provides for a high level of security, the security is highly dependent upon the security measures employed to keep each user's private key secure. Of particular concern are the processes with which the private key is created, distributed, stored, and retrieved. To assure that the private key is not discernable from the public key, the public and private keys are conventionally very large numbers; for example, RSA utilizes as many as 200 digits. UK Patent Application, "Data communications using public key cryptography", UK serial number GB 2,318,486A, publication date Apr. 22, 1998, filed Oct. 16, 1996 for C. J. Holloway, discloses a method for storing a user's private key on a server in an encrypted form, for subsequent retrieval and decryption by the user, but specifies that the private key should preferably be generated at the user's computer (a client processor in a client-server network), to limit the exposure of the private key. In general, the creation of a public/private key pair that is truly secure requires significant computational resources, and a source of a truly random number. To avoid the cost and loss of control that may result by enabling each user in a networked environment to create a public/private key pair, the public/private key pairs are typically generated by an administrator of the network using, for example, a dedicated processor that is physically isolated from the network or other systems. Using this approach, a public/private key pair is distributed to each new user via a secure delivery means, such as a hand-delivered document or diskette containing the public/private key pair. Although less costly than providing the resources to enable each user to generate a public/private key pair directly, the hand-delivery distribution system is awkward, but heretofore required, particularly in a networked environment wherein the communication paths are susceptible to unauthorized or inappropriate monitoring.

BRIEF SUMMARY OF THE INVENTION

It is an object of this invention to provide a method for securely distributing private keys in a network environment. It is a further object of this invention to provide a method for securely storing private keys in a networked environment. It is a further object of this invention to provide a method for securely retrieving private keys in a networked environment. It is also an object of this invention to provide a server processor that facilitates the secure distribution, storage, and retrieval of private keys in a client-server environment. It is also an object of this invention to provide a client processor that facilitates the secure distribution, storage, and retrieval of private keys in a client-server environment. It is also a further object of this invention to provide a client-server system that facilitates the secure distribution, storage, and retrieval of private keys among multiple client processors.

These objects and others are achieved by storing a list of public/private key pairs at the server, wherein the private key is stored in an encrypted form, the encryption being based on a master key. To distribute a public/private key pair to a new user, an administrator who has access to the master key retrieves the next available public/private key pair from the server at a client processor that is convenient to both the administrator and the new user. At the client processor, the administrator decrypts the private key of the public/private key pair, using the master key, and provides both the public and private keys to the new user. Preferably during this same client session, the new user encrypts the private key, using a password, passphrase, or biometric information that is secret to the new user, and memorable. The private key is immediately erased from the client processor upon encryption with the user's memorable key. The encrypted private key, the corresponding public key, and an identification of the new user are communicated to and stored at the server for subsequent access by the new user, and potentially others. By employing this technique, the private key is vulnerable to detection only within the client processor, and only for a brief period of time.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
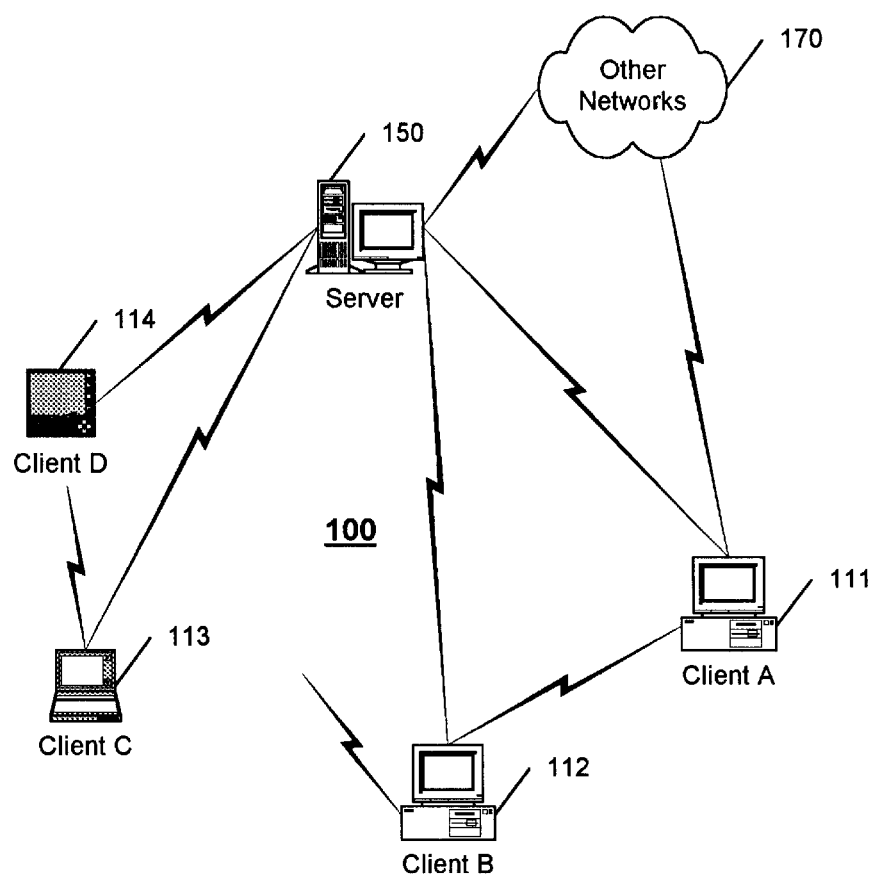
FIG. 1 illustrates an example networked communications systems comprising a server processor and a plurality of client processors.

FIG. 1 illustrates a network system 100 comprising a server processor 150 and client processors 111–114. Each of the client processors 111–114 communicate with the server processor 150, and may communicate to each other, and other networks 170 as well. The network system 100 may be a local area network, a home control network, a private network, a public network, such as the Internet, and so on. Client-server networks offer significant advantages, typically in the area of resource utilization. For ease of understanding, a corporate network will hereinafter be used as a paradigm for a network system. Consider the addition of a new user to the network, as when a new employee joins the corporate organization. Conventionally, as discussed above, an administrator generates a public/private key pair for the new employee on a secure processor, and delivers a diskette to the new employee containing the allocated public/private key pair.

Figure 2:
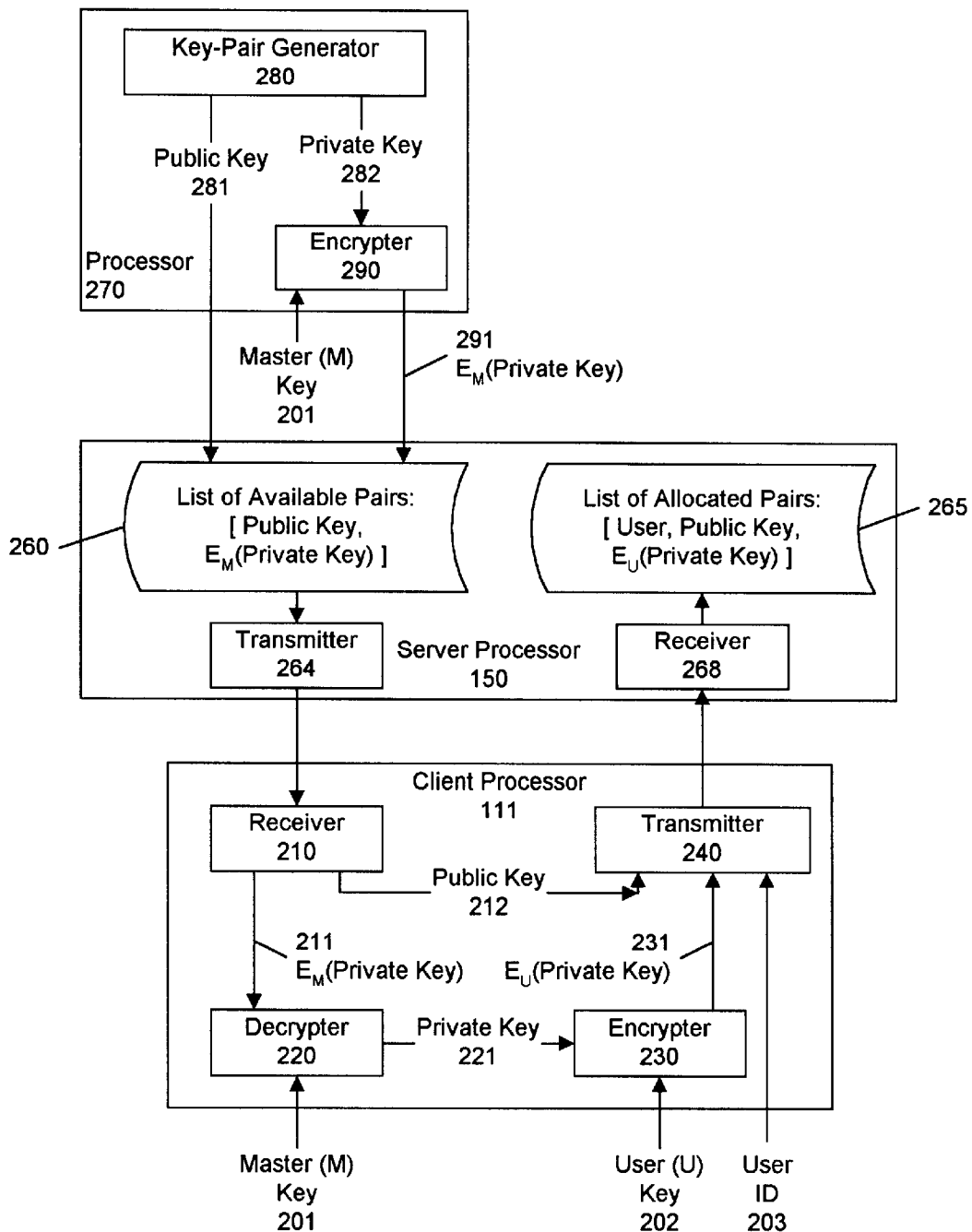
FIG. 2 illustrates an example server processor and client processor for the distribution and storage of public/private key pairs in accordance with this invention.

FIG. 2 illustrates an example server processor and client processor that illustrates a secure process for the distribution of public/private key pairs in a networked environment. In a preferred embodiment of this invention, the server 150 contains a list 260 of public/private key pairs, wherein the private key is stored in an encrypted form. A processor 270 that may be part of, or independent of, the server 150 includes a generator 280 of public/private key pairs, and an encrypter 290 that encrypts the private key 282 corresponding to each public key 281, the encryption being based on a master key M 201. For ease of understanding, the encryption via the master key M 201 is presented herein as a symmetric encryption, such that, as discussed below, the private key 282 can be decrypted by the same master key M. As would be evident to one of ordinary skill in the art, an asymmetric encoding could be employed as well, wherein the private key is encrypted using a public key corresponding to a private master key M', and thereby able to be decrypted by this private master key M'.

When a public/private key pair is required to be distributed to a new user, an administrator having the master key M 201 accesses the server 150, via a client processor 111 that is convenient to both the administrator and the new user. (For ease of reference, the reference numeral of the client processor 111 of FIG. 1 is selected for illustrative purposes in FIG. 2, although any client processor 111–114 could contain the elements illustrated in FIG. 2.) The administrator accesses the server processor 150 via the client processor 111, and using conventional server access and download techniques, receives the next available pair of public and encrypted private keys from the list of available pairs 260, via the transmitter 264 and receiver 210. The encrypted private key 211 is provided to a decrypter 220. The administer provides the master key M 201 to the decrypter 220, so that the decrypter 220 is able to decrypt the encrypted private key 211 to recreate the private key 221 corresponding to the public key 212. This private key 221 is subsequently reencrypted, using a key U that is specific to the new user. The private key 221 is then erased from the client processor. In a preferred embodiment, the decrypter 220 and encrypter 230 are integrated as a single functional unit, so that the exposure of the private key 221 is minimized. The key U that is used to reencrypt the private key 221 may be a biometric key, based for example on a finger print or retina print of the new user. Copending U.S. patent application "Biometric Identification Mechanism That Preserves the Integrity of the Biometric Information", Ser. No. 09/211, 155, filed Dec. 14, 1998 for Michael Epstein, discloses a technique for securely communicating biometric information, and is incorporated by reference herein. The key U may be based on a password or passphrase created by the user that is easier to remember than, for example, a two-hundred-digit RSA private key 221. A symmetric encryption is used in the encrypter 230, so that the same biometric data, or memorized password or passphrase, can be used to decrypt the private key 221 whenever necessary.

The public key 212 and the corresponding encrypted key 231 are transmitted via a transmitter 240 and receiver 268 for storage in a list 265 at the server processor 150, along with an identification (ID) 203 of the new user corresponding to this key-pair. In this manner, when another user of the network desires to send a secure communication to the new user, the other user can access the list 265 to obtain the new user's public key 212, and encrypt the communication accordingly. In like manner, if the other user authenticates the communication by also encrypting it with the other user's private key, the new user can verify the sender of the encrypted communication by retrieving the other user's public key from the list 265 of allocated public keys on the server 150.

Note that, in accordance with this aspect of the invention, the user's private key 221 is only available in an unencrypted form for the period required to encrypt it into the encrypted private key 231, and is stored and communicated in an encrypted form at all other times. Note also that although this invention provides for the distribution of a private key via a networked system, the unencrypted form is created and used exclusively within the client processor 111, and never appears on the server, nor on any network communication path. Because the client processor 111 is considered locally secure, the distribution of the private key in accordance with this invention adds no additional risk to the security of the private key.

Figure 3:
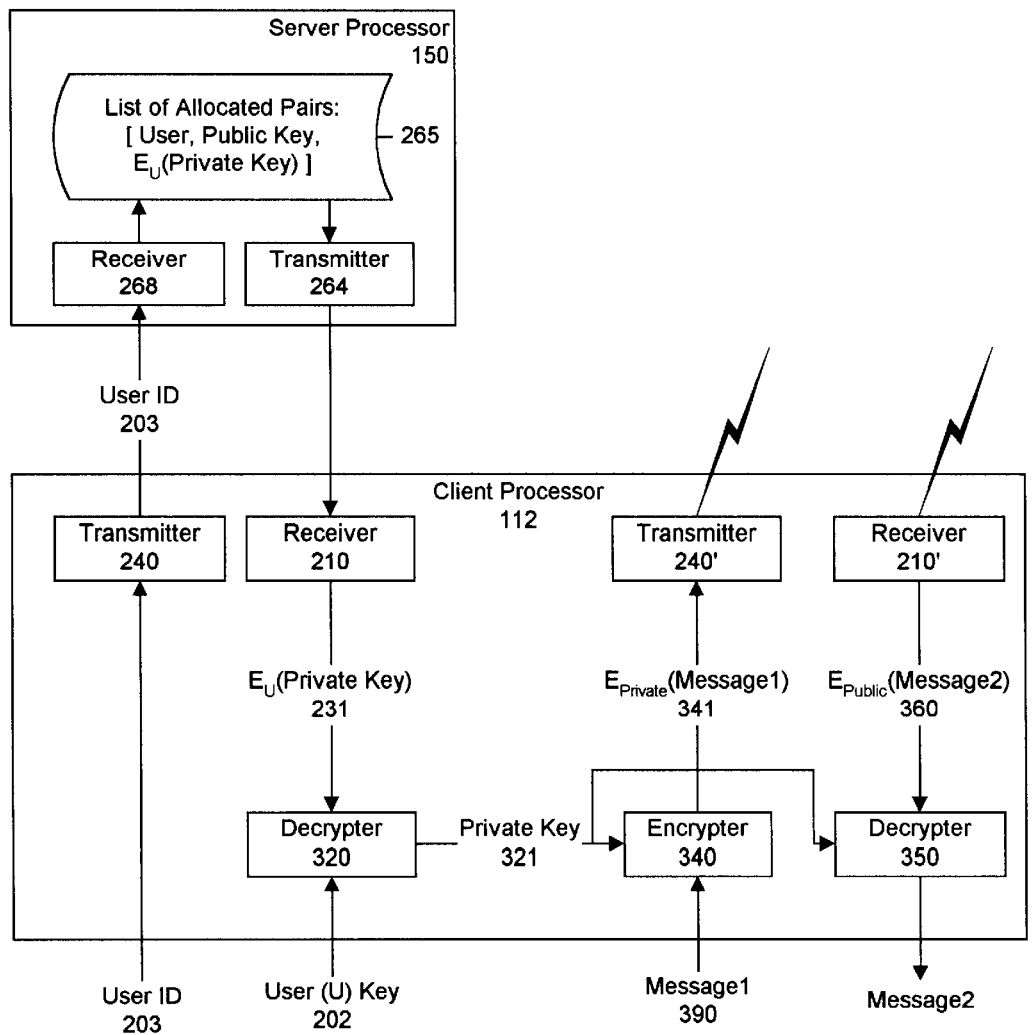
FIG. 3 illustrates an example server processor and client processor for the retrieval of a private key in accordance with this invention.

The storage of the encrypted private key 231 at the server 150 facilitates the use of the user's private key on any client processor 111–114, without storing the private key of each user on each client processor 111–114. FIG. 3 illustrates an example server processor 150 and client processor 112 for the retrieval of a private key in accordance with this invention. For ease of reference, the reference numeral of client processor 112 of FIG. 1 is selected for illustrative purposes in FIG. 3, to illustrate that it may be a different client processor than the client processor 111 that created the encrypted private key 231, as illustrated in FIG. 2. In a preferred embodiment, each client processor 111–114 contains the elements of FIG. 3. Items having the same reference numeral in multiple figures perform substantially the same function.

In FIG. 3, a user (not shown) provides a user ID 203 to the server processor 150, via the transmitter 240 and receiver 268. In response, the server processor 150 communicates the encrypted private key 231 associated with the user ID 203 to the client processor 112, via the transmitter 264 and receiver 210. The user provides the user key U 202 that was used to encrypt the user's private key 221 to a decrypter 320 that provides a decrypted private key 321, which will match the original user's private key only if the proper user key U 202 is provided.

Using this decrypted private key 321, the user can decrypt an encrypted message 360 that was encoded with the user's public key 212 as follows. The encrypted message 360 is received via a receiver 210' in the client processor 112. This receiver 210' may be the receiver 210 used to communicate to the server processor 150, or an alternative receiver that is used to communicate with an other transmitter, for example at the sender's site (not shown). The encrypted message 360 is decrypted by the decrypter 350, using the decrypted private key 321. Because the encrypted message 360 had been encrypted using the user's public key 212, the encrypted message 360 will only be properly decrypted if the decrypted private key 321 matches the original user's private key. Thus, only someone who has the appropriate user key U 202 can decrypt a message 360 that was encrypted with the public key 212 corresponding to the user identified by the user ID 203.

Using the decrypted private key 321, the user can also "sign" a message as follows. The message 390 is encrypted using the decrypted private key 321 by the encrypter 340 to form an encrypted message 341, and transmitted from the client processor. 112 via a transmitter 240'. This transmitter 240' may be the transmitter 240 used to communicate to the server processor 150, or an alternative transmitter that is used to communicate with an other receiver, for example at the intended recipient's site (not shown). The intended recipient will thereafter decrypt the encrypted message 341 using the user's public key 212. Note that the message 390 will be decrypted by the user's public key 212 only if the private key 321 that was used to encrypt the message 390 corresponds to the user's private key 221. Thus, only someone who has the appropriate user key U 202 can sign a message 390 with a signature that is verifiable as corresponding to the user identified by the user ID 203.

The decrypted private key 321 is removed from the client processor 112 after effecting the appropriate decrypting or signing of a message. In a preferred embodiment, the decrypters 320, 350 and the encrypter 340 are integrated, so as to minimize the exposure of the decrypted private key 321.

Note that, in accordance with this aspect of the invention, the user's private key 221 is only available in a decrypted form 321 for the period required to decrypt or sign a message, and is stored and communicated in an encrypted form at all other times.

Figure 4:
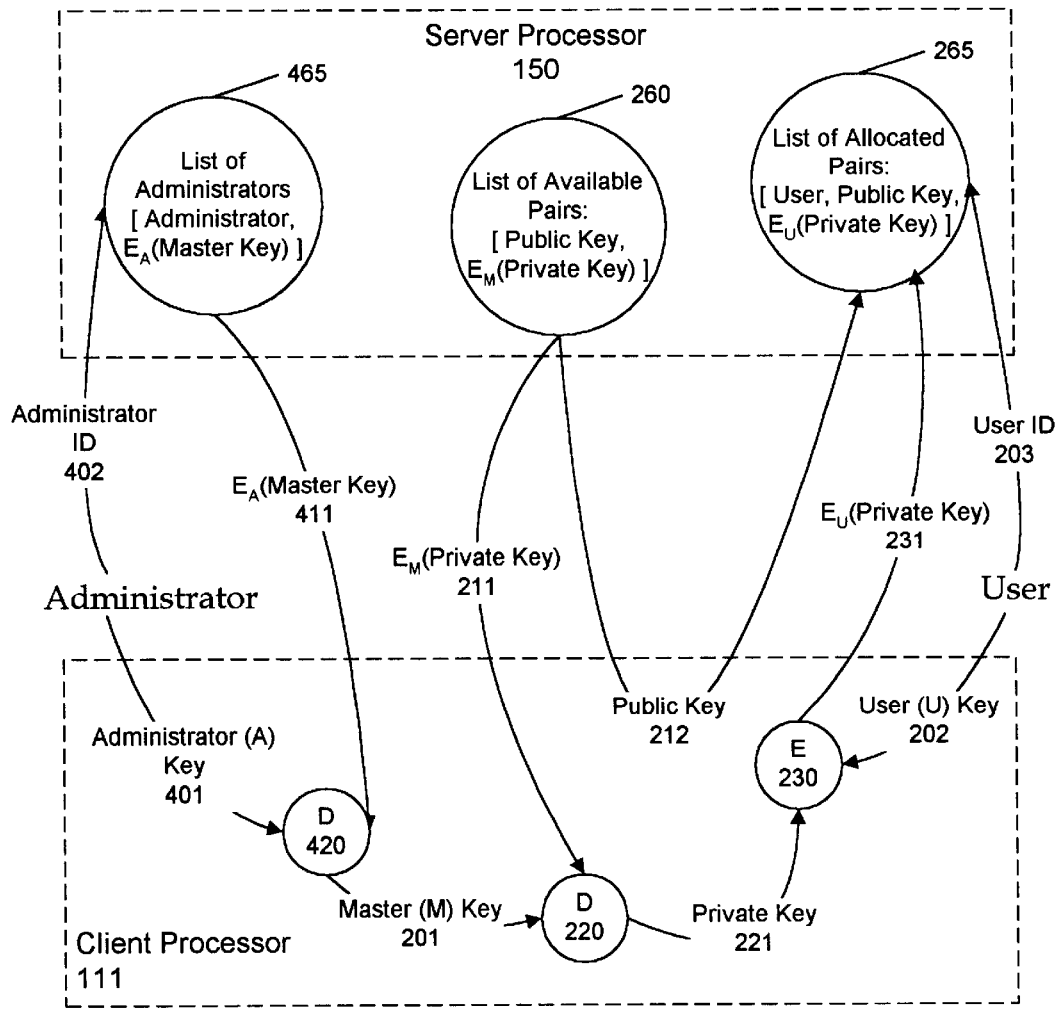
FIG. 4 illustrates an example flow diagram for the distribution and storage of public/private key pairs in accordance with this invention.

FIG. 4 illustrates an example flow diagram for the distribution and storage of public/private key pairs in accordance with this invention, including an additional security measure for access to the master key M. In general, the master key M should be a robust key, comprising many digits, and only accessible by an authorized administrator. Although a key that is based on a biometric of a person, such as a fingerprint or retina print, is usually preferred to grant access to a particular person, the master key M should not be coupled to a characteristic of a particular administrator, because the administrator may be replaced, or additional administrators may be added. To achieve the security of a key that is based on a particular person, yet not base the key on the particular person, in a preferred embodiment of this invention, the master key M 201 is stored on the server 150 in an encrypted form, the encryption being based on a key A that is specific to each individual administrator. Illustrated in FIG. 4 is a list 465 comprising an identification of each administrator, and an encryption of the master key M 201 for each.

In accordance with this aspect of the invention, an administrator at the client processor 111 submits an identification 402 to the server processor 150, in response to which, the server processor returns an encoded master key 411 corresponding to the identification 402 from the list of administrators 465. The administrator decrypts the encoded master key 411 via the decrypter 420 by providing the appropriate administrator key A 401. As with the aforementioned user key U 201, the key A 401 that is used to encrypt and decrypt the master key M 201 may be a biometric key, based for example on a finger print or retina print of the administrator; or, it may be a password or passphrase created by the administrator that is easier to remember.

As discussed above, and presented here for completeness, upon a request by the administrator, the next available public key 212 and encrypted private key 211 are communicated from the list 260 at the server processor 150. The decrypted master key M 201 is used to decrypt the encrypted private key 211 at the decrypter 220 to produce the private key 221 corresponding to the public key 212. The private key 221 is reencrypted at the encrypter 230, using the user key U 202, and communicated to the server processor 150 for storage in the list 265 with the public key 212 and the user identification 203.

As is evident from the flow diagram of FIG. 4, the master key M 201 and the private key 221 are only present at the client processor 111 that is being used by the administrator and the, user to effect the distribution of the public 212 and private key 221 to the user. Thus, the security of the master key M 201 and private key 221 is high, even though access to the data communicated between the server 150 and client processor 111 may be open to a multitude of other users. Note that the only data that is communicated between the server 150 and client 111 is encrypted data 411, 211, and 231, and publicly available information 402, 203, and 212.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. A method of securing a private key on a client-server network, comprising:

accessing a first key-pair on a server processor, the first key-pair comprising a public key and a first encrypted private key corresponding to the public key, communicating the first encrypted private key to a client processor, decrypting the first encrypted private key at the client processor using a first key to produce the private key, encrypting the private key at the client processor using a second key to produce a second encrypted private key corresponding to the public key, communicating the second encrypted private key to the server processor, and storing the second encrypted private key corresponding to the public key at the server processor to facilitate a subsequent communication of the second encrypted private key to an other client processor.

2. The method of claim 1, further including:

removing the first encrypted private key from the server processor.

3. The method of claim 1, wherein decrypting the first encrypted private key is based on a symmetric key cryptosystem.

4. The method of claim 1, wherein decrypting the first encrypted private key is based on an asymmetric key cryptosystem.

5. The method of claim 1, wherein encrypting the second encrypted private key is based on a symmetric key cryptosystem.

6. The method of claim 1, wherein encrypting the second encrypted private key is based on an asymmetric key cryptosystem.

7. The method of claim 1, wherein the first key-pair is stored in a list of available key-pairs on the server processor.

8. The method of claim 1, further including obtaining user information to produce the second key.

9. The method of claim 8, wherein the user information includes at least one of: a biometric information, a password, and a passphrase.

10. The method of claim 1, further including decrypting an encrypted first key at the client processor using an administrator key to produce the first key.

11. The method of claim 10, wherein the administrator key is based on at least one of: a biometric information, a password, and a passphrase.

12. A client processor comprising:

a receiver that receives a first encrypted private key corresponding to a public key of a key-pair from a server processor, a decrypter that decrypts the first encrypted private key based on a first key to produce a private key corresponding to the public key, an encrypter that encrypts the private key based on a second key to produce a second encrypted private key, and a transmitter that transmits the second encrypted private key corresponding to the public key to the server processor to facilitate a retrieval of the second encrypted private key by an other client processor.

13. The client processor of claim 12, further including an other decrypter that decrypts an encrypted first key based on an administrator key to produce the first key.

14. The client processor of claim 13, wherein the administrator key is based on at least one of: a biometric information, a password, and a passphrase.

15. The client processor of claim 12, further including an input device that provides user information to produce the second key.

16. The client processor of claim 15, wherein the user information includes at least one of: a biometric information, a password, and a passphrase.

17. A server processor comprising a storage device that provides a public key and a first encrypted private key corresponding to the public key, a transmitter, operably coupled to the storage device, that transmits the first encrypted private key to a client processor, a receiver, operably coupled to the storage device, that receives a second encrypted private key corresponding to the public key and communicates the second encrypted private key to the storage device to facilitate a transmission of the second encrypted private key to an other client processor.

18. The server processor of claim 17, wherein the transmitter also transmits an encrypted first key to the client processor to facilitate a decryption of the first encrypted private key at the client processor.

19. The server processor of claim 17, wherein the storage device includes a plurality of public keys and first encrypted private keys, from which the public key and first encrypted private key are provided.

20. The server processor of claim 17, wherein the first encrypted private key is encrypted based on a master key, and the storage device also provides an encrypted master key based on an encryption of the master key that uses an administrator key.

21. The server processor of claim 20, wherein the storage device includes a plurality of administrator identifiers and corresponding encrypted master keys, from which the encrypted master key is provided.

* * * * *